United States Patent
Skaff et al.

(10) Patent No.: US 10,549,636 B2
(45) Date of Patent: Feb. 4, 2020

(54) INFORMATION DISPLAY SYSTEMS AND METHOD FOR DISPLAY AN EFFICIENCY GAUGE AND TARGET

(71) Applicant: Ford Global Technologies, LLC, Dearborn, MI (US)

(72) Inventors: Ryan J. Skaff, Farmington Hills, MI (US); Dale Gilman, Beverly Hills, MI (US); Paul Aldighieri, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 15/449,453

(22) Filed: Mar. 3, 2017

(65) Prior Publication Data
US 2018/0253990 A1    Sep. 6, 2018

(51) Int. Cl.
*B60K 35/00*    (2006.01)
*G09B 5/02*    (2006.01)

(52) U.S. Cl.
CPC ............... *B60K 35/00* (2013.01); *G09B 5/02* (2013.01)

(58) Field of Classification Search
CPC combination set(s) only.
See application file for complete search history.

(56) References Cited

U.S. PATENT DOCUMENTS

| | | | |
|---|---|---|---|
| 2,685,198 A | 8/1954 | Saul, Sr. | |
| 3,977,238 A | 8/1976 | Byington, Jr. | |
| 4,050,295 A | 9/1977 | Harvey | |
| 4,113,046 A | 9/1978 | Arpino | |
| 4,570,226 A | 2/1986 | Aussedat | |
| 4,590,568 A | 5/1986 | Barske et al. | |
| 5,006,829 A | 4/1991 | Miyamoto et al. | |
| 5,459,666 A | 11/1995 | Casper et al. | |
| 5,534,759 A | 7/1996 | Evans et al. | |
| 5,916,298 A | 6/1999 | Kroiss et al. | |
| 6,453,731 B1 | 9/2002 | Yaegashi | |
| 6,467,337 B2 | 10/2002 | Sadahiro et al. | |
| 6,480,106 B1 | 11/2002 | Crombez et al. | |
| 6,748,319 B2 | 6/2004 | Aoki et al. | |
| 7,024,306 B2 | 4/2006 | Minami et al. | |
| 7,072,762 B2 | 7/2006 | Minami et al. | |
| 7,237,203 B1 | 6/2007 | Kuenzner | |
| 7,865,276 B2 | 1/2011 | Skaff et al. | |
| 8,554,399 B2 | 10/2013 | Fleckner et al. | |
| 8,761,980 B2 | 6/2014 | Kimoto | |

(Continued)

FOREIGN PATENT DOCUMENTS

| CN | 1321594 A | 11/2001 |
|---|---|---|
| CN | 101354439 A | 1/2009 |

(Continued)

*Primary Examiner* — Nabil H Syed
*Assistant Examiner* — Cal J Eustaquio
(74) *Attorney, Agent, or Firm* — Frank Lollo; Brooks Kushman, P.C.

(57) ABSTRACT

An information display system includes a display including an energy consumption gauge having a bar. The display system includes a controller in communication with the display and configured to instruct the display to include an average efficiency indicator relatively arranged on the bar based on a calculated driver efficiency value, and instruct the display to include a peer efficiency indicator relatively arranged on the bar based on a peer efficiency value.

16 Claims, 6 Drawing Sheets

(56) References Cited

U.S. PATENT DOCUMENTS

| | | |
|---|---|---|
| 8,860,565 B2 | 10/2014 | Skaff et al. |
| 9,378,595 B2 | 6/2016 | Esler et al. |
| 9,499,065 B2 | 11/2016 | Skaff et al. |
| 2003/0006914 A1 | 1/2003 | Todoriki et al. |
| 2004/0218197 A1 | 11/2004 | Vliembergen et al. |
| 2007/0247291 A1 | 10/2007 | Masuda et al. |
| 2008/0163811 A1 | 7/2008 | Nakamichi |
| 2009/0040033 A1 | 2/2009 | Uchida |
| 2009/0157267 A1 | 6/2009 | Shin et al. |
| 2009/0157290 A1 | 6/2009 | Ji et al. |
| 2009/0243827 A1 | 10/2009 | Burke et al. |
| 2009/0288636 A1 | 11/2009 | Saito et al. |
| 2010/0057280 A1 | 3/2010 | Crowe et al. |
| 2010/0057281 A1 | 3/2010 | Lawyer et al. |
| 2010/0106351 A1 | 4/2010 | Hanssen et al. |
| 2010/0168944 A1 | 7/2010 | Otake |
| 2010/0219945 A1 | 9/2010 | Schumann et al. |
| 2010/0236847 A1 | 9/2010 | Yang et al. |
| 2010/0241301 A1 | 9/2010 | Yang |
| 2010/0265050 A1 | 10/2010 | Skaff et al. |
| 2010/0274394 A1 | 10/2010 | Wijaya et al. |
| 2011/0032110 A1 | 2/2011 | Taguchi |
| 2011/0043346 A1 | 2/2011 | Hoffmeister |
| 2011/0178670 A1 | 7/2011 | Perkins et al. |
| 2011/0187550 A1 | 8/2011 | Ringenwald |
| 2011/0241861 A1* | 10/2011 | Levy .................. B60K 35/00 340/439 |
| 2012/0035843 A1 | 2/2012 | Miura et al. |
| 2012/0112696 A1 | 5/2012 | Ikeda et al. |
| 2012/0116606 A1 | 5/2012 | Ichinokawa |
| 2012/0139922 A1 | 6/2012 | Heo |
| 2012/0197517 A1 | 8/2012 | Sengoku et al. |
| 2012/0203449 A1 | 8/2012 | Sengoku et al. |
| 2012/0293122 A1 | 11/2012 | Murawaka |
| 2012/0319828 A1 | 12/2012 | Krauss et al. |
| 2013/0054118 A1 | 2/2013 | Nagumo et al. |
| 2013/0096895 A1 | 4/2013 | Willard et al. |
| 2013/0158898 A1 | 6/2013 | Fukuda et al. |
| 2016/0110935 A1* | 4/2016 | Kwak ................ G07C 5/0808 701/123 |
| 2016/0198306 A1* | 7/2016 | Miles .................. B60W 40/09 455/456.3 |
| 2017/0089274 A1* | 3/2017 | Kolhouse ............ F02D 41/0002 |

FOREIGN PATENT DOCUMENTS

| | | |
|---|---|---|
| CN | 101841070 A | 9/2010 |
| DE | 102010010620 A1 | 1/2011 |
| JP | 3780521 B2 | 5/2006 |
| JP | 2007078699 A | 3/2007 |
| WO | 2013138798 A1 | 9/2013 |

* cited by examiner

INFORMATION DISPLAY SYSTEMS AND METHOD FOR DISPLAY AN EFFICIENCY GAUGE AND TARGET

TECHNICAL FIELD

The present disclosure relates to information display systems and methods for displaying an efficiency gauge and target.

BACKGROUND

Vehicles may include a number of gauges, indicators, and various other displays to provide the vehicle operator with information regarding the vehicle and its surroundings. With the advent of new technologies, such as hybrid electric vehicles (HEVs), plug-in electric vehicles (PHEVs) and battery electric vehicles (BEVs), has come a variety of new gauges and information displays that help guide drivers to better learn, understand, and trust the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

Some drivers may not be able to achieve desired fuel economy or energy efficiency numbers, in part because of their driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Displaying certain types of information, particularly information relevant to HEVs, PHEVs or BEVs, can help facilitate economical driving choices.

SUMMARY

An information display system may include a display including an energy consumption gauge having a bar. The display system may include a controller in communication with the display and configured to instruct the display to include an average efficiency indicator relatively arranged on the bar based on a calculated driver efficiency value, and instruct the display to include a peer efficiency indicator relatively arranged on the bar based on a peer efficiency value.

A method may include determining a peer driving efficiency for an electric vehicle based on peer efficiency data, calculating an average driver efficiency, and displaying an efficiency gauge having an average efficiency indicator corresponding to the average driver efficiency and a peer efficiency indicator corresponding to the peer efficiency, wherein the average efficiency indicator and peer efficiency indicator are displayed along the gauge relative to one another based on their respective efficiencies.

An energy consumption gauge may include a linear bar having an upper limit and a lower limit, an efficiency indicator corresponding to an energy consumption rate and movable between the upper and lower limits, and a peer indicator corresponding to a peer consumption rate and movable between the upper and lower limits to illustrate a comparison between the energy consumption rate and the peer consumption rate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is an information display system configured to display a driver efficiency indicator and a peer efficiency indicator along a gauge. This may provide the driver with a visual indication of his or her driving efficiency as it relates to his or her peers. By providing the indicators, the system may give the driver a competitive incentive when driving to achieve a driving efficiency that is better than that of his or her peers.

Figure 1:
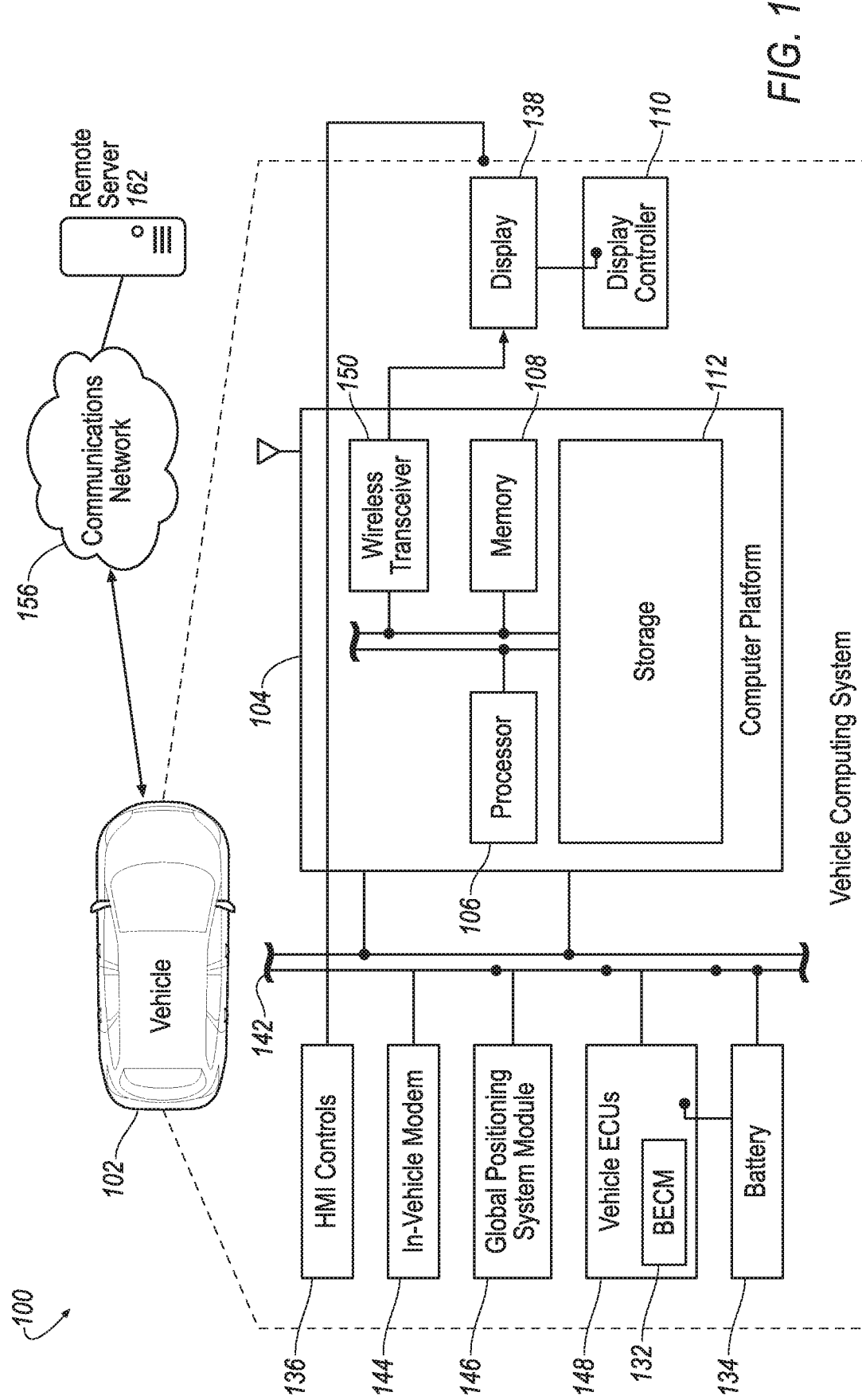
FIG. 1 illustrates an example system diagram for an information display system.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions to provide features efficiency gauge displays via a display 138. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a display controller 110. In some cases, the display 138 may be a touch screen further configured to receive user touch input via the display controller 110, while in other cases the display 138 may be a display only, without touch input capabilities.

In the examples herein, the display 138 may be configured to provide relevant vehicle content to a driver of the vehicle 102 before, during and/or after operation. The display 138, although not shown, may include a dedicated controller and memory, though described herein the display 138 is controlled by the processor 106 of the computing platform 104 and/or the display controller 110. The computing platform 104 may be configured to receive input that relates to current operating condition of the vehicle 102. For example, the computing platform 104 may receive input signals form the vehicle ECU's 148 such as the BECM 132, the transmission (e.g., motor and or inverter), the climate control system, the braking system, the acceleration system, etc. The computing platform 104 may provide output to the display 138 (as well as the display controller 110) such that the display 138 conveys energy consumption and range information, or other information relating to the operation of the vehicle 102 to a driver. Although the processes described herein may be described as being performed by the computing platform 104 and/or the processor 106 the processes may be performed by the display controller 110 or a combination of the computing platform 104 and the display controller 110.

The display 138 may be arranged within a dashboard (not shown) of the vehicle 102, such as an instrument panel or center console area. The display 138 may also be part of another display system such as the navigation system, or may be part of a dedicated information display system. The display 138 may be a liquid crystal display (LCD), a plasma displays, an organic light emitting display (OLED), etc. The display 138 may include a touch screen for receiving driver input associated with the selected areas of the display 138. The display 138 may also include one or more buttons (not shown), including hard keys or soft keys, located adjacent the display 138.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an in-vehicle modem 144 (which may not be present in some configurations), a global positioning system (GPS) module 146 configured to provide current vehicle 102 location and heading information, and various vehicle ECUs 148 configured to provide other types of information regarding the systems of the vehicle 102.

For example, the ECUs 148 may include a battery energy control module (BECM) 132 connected to a main battery 134. The battery 134 may be a high voltage battery that is capable of outputting electrical power to operate the motor 12. According to one or more embodiments, the main battery 134 may be a battery pack made up of several battery modules. Each battery module may contain a plurality of battery cells. The battery cells may be air cooled using existing vehicle cabin air. The batter cells may also be heated or cooled using fluid coolant system. The BECM 132 may act as a controller for the main battery 134. The BECM 132 may also include an electronic monitoring system that manages temperature and state of charge of each of the battery cells. Other types of energy storage systems can be used with a vehicle, such as the vehicle 102. For example, a device such as a capacitor can be used, which, like a high voltage battery, is capable of both storing and outputting electrical energy. Alternatively, a device such as a fuel cell may be used in conjunction with battery and/or capacitor to provide electrical power for the vehicle.

As some other non-limiting possibilities, the vehicle ECUs 148 may also include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the HMI controls 136, the vehicle modem 144, GPS module 146, and vehicle ECUs 148 may communicate with the computing platform 104 over an in-vehicle network 142. In other examples, the computing platform 104 may be connected to more than one in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices (not shown) of the vehicle occupants. The mobile devices may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver of the mobile device. The wide-area network 156 may provide communications services, such as packet-switched network services (e.g., Internet access, VoIP communication services), to devices connected to the wide-area network 156. An example of a wide-area network 156 may include a cellular telephone network.

A remote telematics server 162 may be in communication with the computing platform 104 of the vehicle 102 via the WAN or the wireless transceiver 150 The remote telematics server 162 may provide information and data to the vehicle 102. In the examples discussed herein, the server 162 may provide efficiency data such as peer efficiency data including energy consumption data associated with at least one peer which may be used to determine an average efficiency of a group of peers. The efficiency data may be received from one or more vehicles (not shown) indicating an efficiency of other drivers. Such data may be used to provide the display 138 with visual indications of user efficiency compared to the peer efficiency. This is described in greater detail below.

Figure 2A:
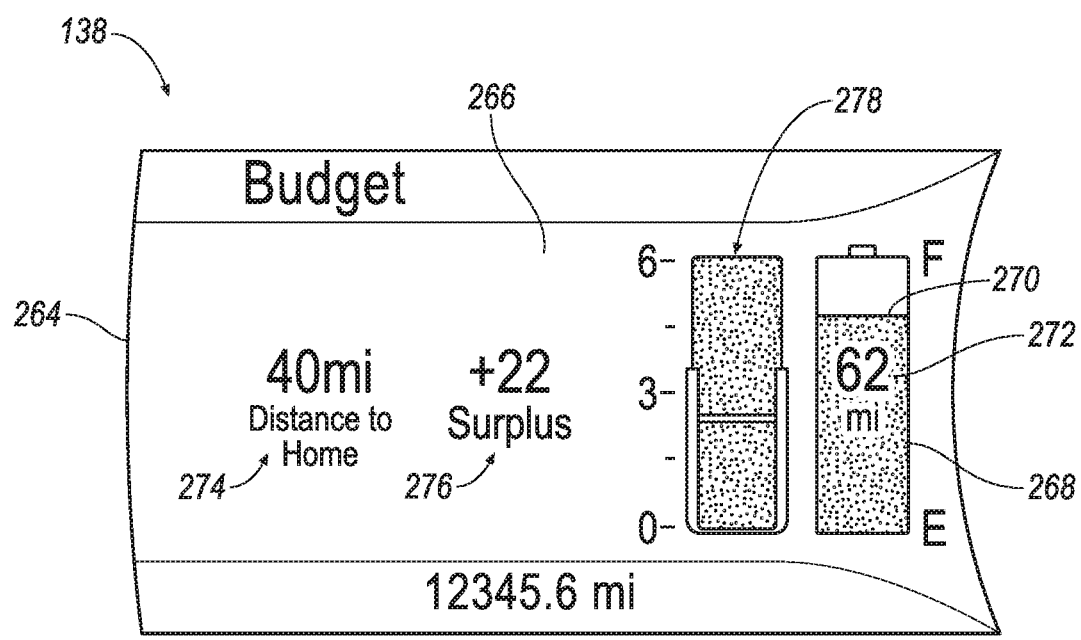
FIGS. 2A and 2B illustrate example displays of the information display system.
Figure 2B:
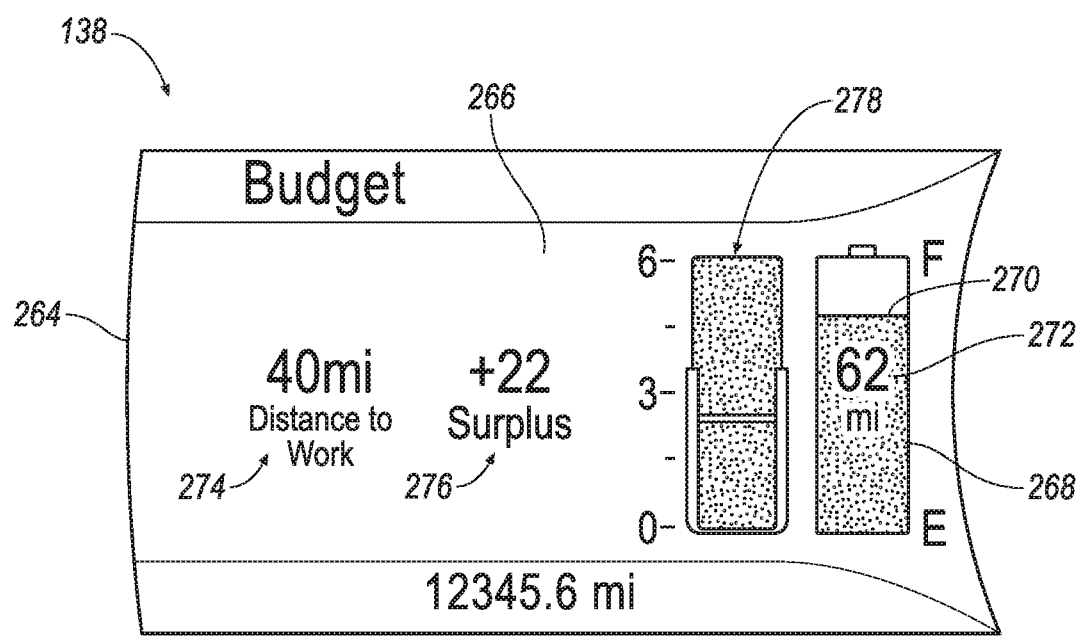

FIGS. 2A and 2B illustrate examples of the display 138. As shown in FIGS. 2A and 2B, the display 138 may display one or more display screens 264 that may change to convey information to the driver. The one or more display screens 264 may be selectable or non-selectable and may transition upon receipt of driver or vehicle input at the processor 106 and HMI controls 136.

The one or more display screens 264 of the display 138 may include a budget view or screen 266. The budget screen 266 may include a battery gauge 268 having a battery state of charge (SOC) indicator 270. The SOC indicator 270 may convey the relative amount of electrical energy remaining in the main battery 134. BEVs may have a limited range or distance that can be traveled before the main battery 134 is depleted. Accordingly, the range of a vehicle may also be referred to as its distance to empty (DTE) value. To convey the DTE value, the battery gauge 268 may also include a DTE indicator 272. As shown in FIG. 2, the DTE indicator 272 may be a digital data readout of the DTE value in units of distance (e.g., miles, kilometers, etc.) Alternatively, the DTE indicator 272 may be displayed elsewhere on the budget screen 266.

Remaining battery charge may be affected by the driving style of the driver. For example, aggressive driving behavior (such as rapid acceleration or braking) may deplete the main battery 134 more rapidly than relatively conservative driving behavior (such as slower acceleration that avoids wheel slip or braking that can be fully absorbed by a regenerative braking system). Thus, the operation of the vehicle 102 may be continuously monitored and analyzed in order to determine the impact of driving behavior on the vehicle's range. The processor 106 may take into account past driving behavior, current driving behavior, or predicted future driving behavior. Along these lines, the budget screen 266 may convey how driving behavior is affecting the vehicle's "energy budget." The concept of an energy budget in the context of the vehicle 102 may relate to an amount or rate of energy consumption that can be afforded without depleting the main battery 134 prior to reaching an intended target (e.g., next charge point, final destination, etc.). Such depletion may be undesirable if the vehicle 102 is required to switch to a different source of energy or is unable to reach the intended target.

Similar to the DTE indicator 272, a distance to target (DTT) indicator 274 may also be a digital data readout of the target distance value. When the DTT value is less than the DTE value, the vehicle 102 may be considered to be operating with an energy "surplus." Conversely, when the DTT value exceeds the DTE value, then the vehicle 102 may be considered to be operating with an energy deficit or "debt." Accordingly, the budget screen 266 may further include a surplus indicator 276 to convey to a driver whether the vehicle 102 has sufficient electrical energy to reach its target. The surplus indicator 276 may also convey the magnitude or amount of the debt/surplus in units of distance. Similar in design to the DTE indicator 272 and the DTT indicator 274, the surplus indicator 276 may also be a digital data readout. As shown in FIGS. 2A and 2B, the amount of surplus (debt) may be obtained by subtracting the DTT value from the DTE value.

The DTT 274 indicator may correspond to a current target distance. As previously mentioned, the target distance may correspond to the current distance from the vehicle 102 to a destination. The destination may be an intermediate charging location, final trip destination, or the like. For example, the destination may be one such as "Home" as shown in FIG. 2A, or "Work," as shown in FIG. 2B. Moreover, the destination may be input by a driver (e.g., via the navigation system 57 or separate target input screen) or may be selected by the vehicle 10 as a default target.

In addition to being shown as digital data, energy budget information may also be conveyed graphically. As shown in FIGS. 2A and 2B, the budget screen 266 may further include an efficiency gauge 278. The efficiency gauge 278 may incorporate information regarding the efficiency of the driver of the vehicle 102 relative to other drivers. As will be explained in greater detail below, the efficiency gauge 278 can help drivers visualize an energy consumption budget. In particular, the efficiency gauge 278 can help drivers determine whether the vehicle 102 is consuming more energy than can be afforded to reach the intended target.

In an example, the efficiency gauge 278 may illustrate a current efficiency of the driver compared to other drivers. The efficiency gauge 278 may provide a game-like scenario to the driver via which the driver may attempt to drive more efficiency than his or her peers. Such indicators may create an incentive for the driver to drive more efficiently.

Figure 3A:
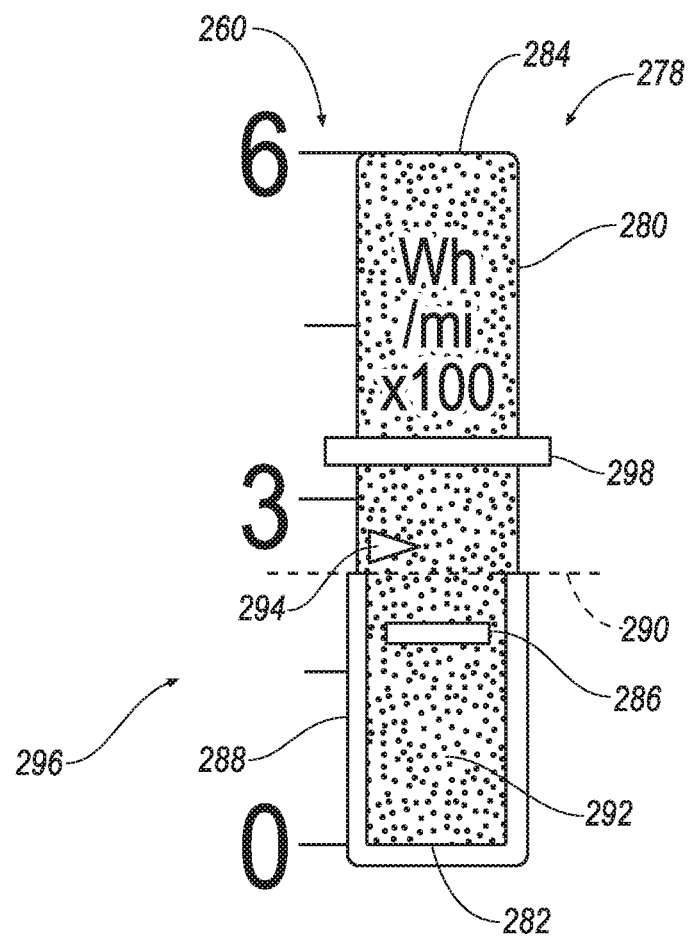
FIGS. 3A and 3B illustrate example gauges of the display.
Figure 3B:
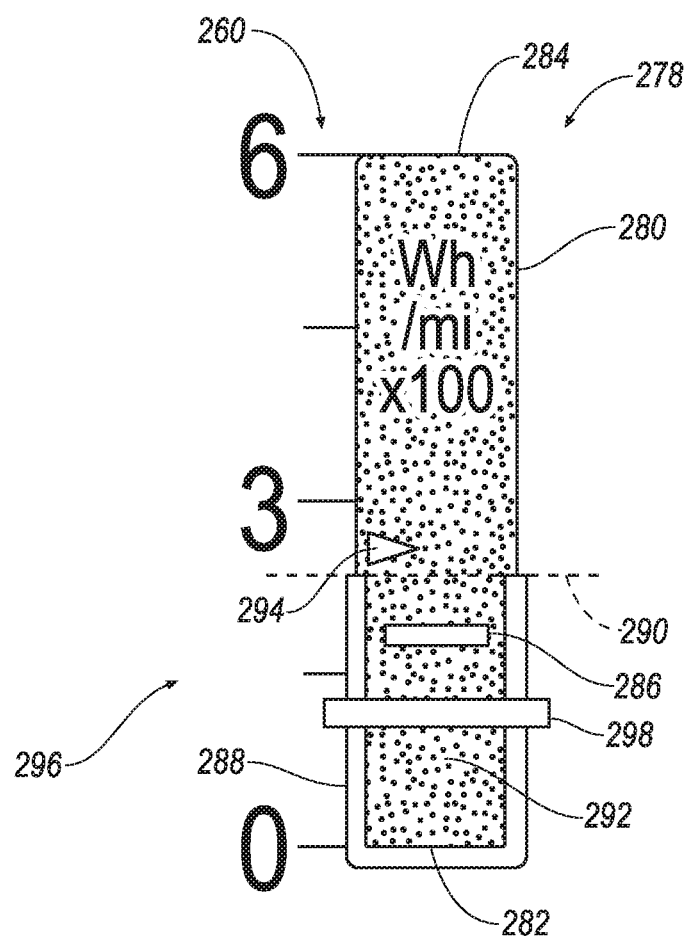

FIGS. 3A and 3B illustrate the efficiency gauge 278 in greater detail. The efficiency gauge 278 may be a linear or non-linear gauge providing for measurement of efficiency along a scale in order to provide an indication of quantity or measurement of efficiency. In many examples, the efficiency gauge 278 may be portrayed as having a vertical or horizontal bar 280, although other possibilities such as an analog gauge are possible. The scale of the gauge (e.g., the bar 280 as shown) may include a lower limit 282 and an upper limit 284. The efficiency gauge 278 may include an instantaneous efficiency indicator 286 that moves along the bar 280 between the lower limit 822 and the upper limit 284 to convey an instantaneous efficiency value to a driver. Although described in terms of efficiency, the efficiency gauge 278 may actually convey information about the usage of energy in real units. To this end, the efficiency gauge 278 may be an energy consumption gauge displaying energy consumption rates. For instance, the efficiency gauge 278 may convey an amount of energy consumed per unit of distance. In this regard, the less energy consumed per unit distance may correspond to more efficient operation of the vehicle 102. By the same token, the closer the instantaneous efficiency indicator 286 is to the lower limit 282 of the efficiency gauge 278, the more energy efficient the vehicle 102 may be operating at a given instant.

The efficiency gauge 278 may further include an average efficiency indicator 294. Similar to the instantaneous efficiency indicator 286, the average efficiency indicator 294 may convey information corresponding to an amount of energy consumed per unit of distance. The average efficiency indicator 294 may provide drivers with additional feedback so they can better manage their driving behavior in order to get the average efficiency indicator 294 inside the safe region 292. The average efficiency indicator 294 may correspond to an average efficiency value. The average efficiency value may be calculated over a sliding window indicating past driving performance. The sliding window may correspond to a recent period of time or distance traveled. For example, the average efficiency value may correspond to driving performance over the last 15 minutes. Of course, alternate rolling time periods may be utilized. As another example, the sliding window may correspond to the driving performance for the current trip or a most recent predetermined number of miles.

In another example, the average efficiency indicator 294 may correspond to a lifetime average efficiency value. In this regard, the average efficiency value may be reset at the request of a driver. Alternatively, the average efficiency value may correspond to the average energy consumption rate for the current charge cycle. Thus, the average efficiency value may be reset after each battery charging session. As another alternative, the average efficiency value may be reset when a charge location is updated, changed or deleted. As yet another alternative, the average efficiency indicator 294 may be used to indicate an expected or predicted future efficiency. The expected future efficiency may be based on a measurement of past efficiency behavior.

The efficiency gauge 278 may include an energy budget element 288 indicating the range of the vehicle 102 (e.g., DTE). The budget element 288 may include a budget threshold 290 defining a safe operating region 292. This region may correspond to a region on the bar 280 in which the average efficiency of the vehicle 102 must operate in to safely reach the target. Thus, a driver may attempt to maintain the instantaneous efficiency indicator 286 within the safe operating region 292 in order to reach the target destination.

The efficiency gauge 278 may include a peer efficiency indicator 298. This peer efficiency indicator 298 may indicate a peer efficiency as received from the remote server 162. Such peer efficiency may include an average efficiency of one or more drivers. The efficiencies may be received from identified peers of the driver. This group of peers and associated efficiencies may form a peer group. For example, the peer efficiencies may reflect efficiencies of the driver's family members. In another example the peer efficiencies may reflect efficiencies of a set group of friends selected by the driver. These "peers" may be selected via the display 138 or via a mobile device, or other computing device. Additionally or alternatively, the peer group may be a default group selected by the processor 106 or other computing device. The default peer group may be composed of drivers in a similar area (e.g., a predefined geographical radius, such as 5 miles) as the driver, or of a similar driving habit (e.g., similar acceleration and deceleration habits), age, average distance traveled, etc.

The peer efficiency indicator 298 may be illustrated on the efficiency gauge 278 in a manner to stand out from the instantaneous efficiency indicator 286 and the average efficiency indicator 294. In the illustrated example, the peer efficiency indicator 298 may form a solid line across the bar 280, as compared to a solid line within the bar 280 for the instantaneous efficiency indicator 286 and a triangular shape within the bar 280 for the average efficiency indicator 294 of the driver. It should be noted that this is merely one example, and other visualizations of the peer efficiency indicator 298, instantaneous efficiency indicator 286 and average efficiency indicator 294 are contemplated. Regardless, as the peer efficiency indicator 298, instantaneous efficiency indicator 286 and average efficiency indicator 294 may all be displayed along the same scale of the efficiency gauge 278, comparison of the relative quantities may be readily performed by the driver.

The peer efficiency indicator 298 may be continually updated to reflect a most recent peer efficiency. As shown in FIG. 3A, the average efficiency indicator 294 may be below the peer efficiency indicator 298, indicating that the average efficiency of the driver is less energy-intensive (e.g., better) than that of the peer group as indicated by the peer efficiency indicator 298. As shown in FIG. 3B, the average efficiency indicator 294 may be above the peer efficiency indicator 298 indicating that the average efficiency of the driver is more energy-intensive (e.g., not better) than that of the peer group.

The peer efficiency indicator 298 may move across the bar 280 such that the peer efficiency indicator 298 may slide from the area above the budget threshold 290 to below the budget threshold 290 within the safe operation region 292.

Figure 4:
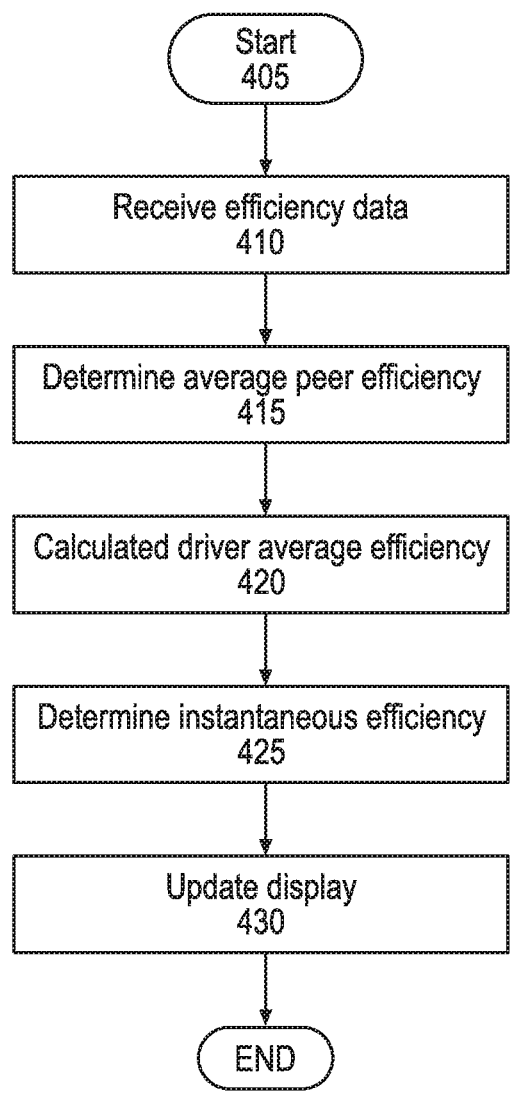
FIG. 4 illustrates an example process for the information display system.

FIG. 4 illustrates an example flow chart depicting a method 400 for displaying the efficiency gauge 278 including the average efficiency indicator 294 and the pear efficiency indicator 298. The process 400 may begin at block 405 which may correspond to the start of a trip (e.g., a key-on event). At step 410, the computing platform 104 may receive the efficiency data. As explained, the efficiency data may be received from the remote server 162 and may include peer efficiency data and/or peer consumption data. The efficiency data may also include vehicle charge and other data received from the ECUs 148, etc. The efficiency data may further include efficiency data relating to the current driver of the vehicle 102 such as historical efficiencies, driver efficiencies, etc.

At block 415, the computing platform 104 may determine the average peer efficiency based on the peer data. This may include averaging each efficiency included in the peer efficiency.

At block 420, the computing platform 104 may determine the average efficiency of the driver corresponding to an average energy consumption rate (e.g., energy per unit distance). The average energy consumption rate may be calculated using any one of several methods. For example, the average energy consumption rate may correspond to the average power output by the vehicle 102 divided by the average vehicle speed. The average efficiency may be based upon a lifetime average, trip average, charge cycle average, or the like. To aid in comparability, in some examples the average efficiency of the driver is computed over the same time period or travel path of that of the average efficiency of the driver.

At step 425, the computing platform 104 may determine an instantaneous efficiency for the vehicle 102. The instantaneous efficiency, as described, may correspond to an instantaneous energy consumption rate (e.g., energy per unit distance). The instantaneous energy consumption rate may be calculated using any one of several methods. For example, the instantaneous energy consumption rate may correspond to the instantaneous power output by the vehicle 102 divided by the current vehicle speed.

At block 430, the computing platform 104 may update, or cause the display 138 to update, to adjust the average efficiency indicator 294 and the peer efficiency indicator 298 based on the average efficiency and peer efficiency. The process may then end.

Accordingly, a peer efficiency indicator 298 and an average efficiency indicator 294 may be arranged on an efficiency gauge 278 to encourage a driver to drive more efficiently than his or her peers in order to "beat" his or her peers. By driving more efficiently and consuming less power and energy, the driver may achieve higher fuel efficiencies and overall all higher user satisfaction with his or her vehicle 102. The sliding peer efficiency indicator may continually update based on efficiency data provided from an external server 162 or vehicle 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An information display system for a vehicle, comprising:
    a display including an energy consumption gauge providing measurement along an efficiency scale; and
    a controller, in communication with the display, configured to
        include an average efficiency indicator along the scale indicative of an efficiency of a driver of the vehicle, and
        include a peer efficiency indicator, based on a peer consumption rate, along the scale indicative of an efficiency of driving peers of the driver, wherein the peer consumption rate includes an average consumption rate of a peer group of drivers with similar driving habits as a driver of a vehicle.

2. The information display system of claim 1, wherein gauge includes a bar and the peer efficiency indicator and the average efficiency indicator are arranged on the bar between an upper limit and a lower limit.

3. The information display system of claim 2, wherein the peer efficiency indicator is closest to the upper limit, and the average efficiency indicator is closest to the lower limit, in response to the efficiency of the driver being lower than the efficiency of driving peers.

4. The information display system of claim 2, wherein the peer efficiency indicator is closest to the lower limit, and the average efficiency indicator is closest to the upper limit, in response to the efficiency of driving peers being lower than the efficiency of the driver.

5. The information display system of claim 1, wherein the peer group includes drivers within a predefined geographic radius of the vehicle.

6. The information display system of claim 1, wherein the peer group includes drivers with aggressive driving habits as a driver of the vehicle.

7. A method, comprising:
    determining a peer driving efficiency for an electric vehicle based on peer efficiency data for a peer group including a plurality of peers, wherein the peer group includes drivers with similar driving habits as a driver of the vehicle;
    calculating an average driver efficiency; and
    displaying an efficiency gauge having an average efficiency indicator corresponding to the average driver efficiency, and a peer efficiency indicator corresponding to the peer efficiency, wherein the average efficiency indicator and peer efficiency indicator are displayed along a scale of the gauge relative to one another based on their respective efficiencies.

8. The method of claim 7, wherein the peer efficiency indicator and the average efficiency indicator are arranged on a bar between an upper limit and a lower limit.

9. The method of claim 8, further comprising displaying the peer efficiency indicator closest to the upper limit, and the average efficiency indicator closest to the lower limit, in response to the average driver efficiency being lower than the peer efficiency.

10. The method of claim 8, further comprising displaying the peer efficiency indicator closest to the lower limit, and the average efficiency indicator closest to the upper limit, in response to the peer efficiency being lower than the average driver efficiency.

11. The method of claim 7, further comprising receiving peer efficiency data including energy consumption data associated with the peer group, and determining the peer efficiency based on the peer efficiency data.

12. The method of claim 7, wherein the plurality of peers are driver selected.

13. The method of claim 7, wherein the peer group includes drivers in a predefined geographic radius of the vehicle.

14. The method of claim 7, wherein the peer group includes drivers with similar driving habits as a driver of the vehicle.

15. An energy consumption gauge, comprising:
    a linear bar providing an efficiency scale between an upper limit and a lower limit;
    an efficiency indicator corresponding to an energy consumption rate and movable along the scale between the upper and lower limits,
    a peer indicator corresponding to a peer consumption rate and movable along the scale between the upper and lower limits to illustrate a comparison between the energy consumption rate and the peer consumption rate, wherein the peer consumption rate includes an average consumption rate of a peer group of drivers with similar driving habits as a driver of a vehicle.

16. The energy consumption gauge of claim 15, wherein the peer indicator and the efficiency indicator are arranged on the bar between an upper limit and a lower limit wherein the peer indicator and the efficiency indicator are arranged one of closer to the upper limit or the lower limit to indicate a continually updated and relative energy consumption rate with respect to each other.

* * * * *